H. A. WENDELL & G. P. BALDWIN.
Lubricating Wedges for Railroad Axle-Boxes.
No. 147,719.   Patented Feb. 17, 1874.
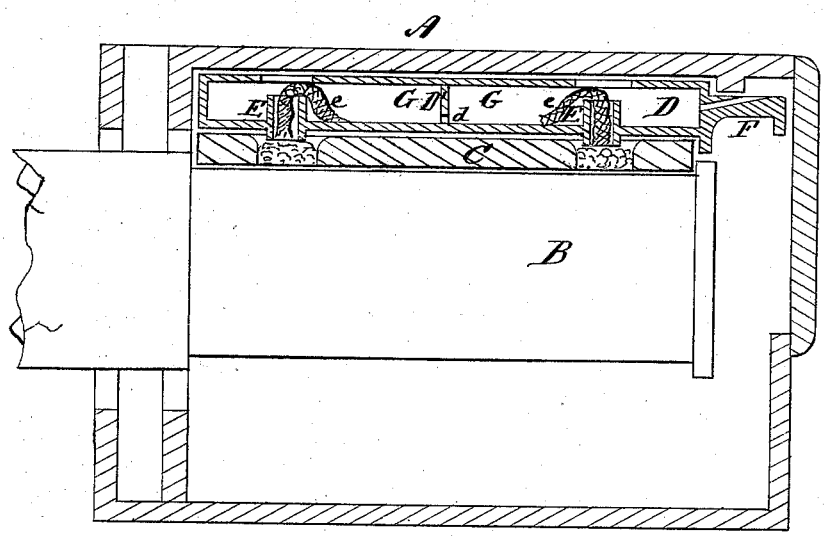

UNITED STATES PATENT OFFICE.

HENRY A. WENDELL, OF PHILADELPHIA, PENNSYLVANIA, AND GEORGE P. BALDWIN, OF ORANGE, NEW JERSEY.

IMPROVEMENT IN LUBRICATING-WEDGES FOR RAILROAD AXLE-BOXES.

Specification forming part of Letters Patent No. 147,719, dated February 17, 1874; application filed July 14, 1873.

*To all whom it may concern:*

Be it known that we, HENRY A. WENDELL, of Philadelphia, in the county of Philadelphia, State of Pennsylvania, and GEORGE P. BALDWIN, of Orange, in the county of Essex and State of New Jersey, respectively, have invented certain new and useful Improvements in Lubricating-Wedge for Railroad Axle-Boxes; and we do hereby declare the following to be a full, clear, and exact description of the invention, such as will enable others skilled in the art to which it pertains to make and use it, reference being had to the accompanying drawings, which form part of this specification.

The drawing shows a vertical longitudinal section of our invention.

Our improvement has reference to lubricators and axle-boxes, applicable to steam and horse railroads. The invention consists, essentially, in constructing the wedge, as hereinafter mentioned and described, with an oil chamber or reservoir, said reservoir being closed at the top, and having wick-tubes in its floor or bottom.

Referring to the drawing, A represents an ordinary railroad-car axle-box, and B the journal, in position in said box. C is an ordinary brass bearing, through which holes are drilled, to permit the passage of oil to the journal. D is the wedge, made hollow, as shown, to form an oil reservoir or chamber, divided into compartments G G, which communicate, by means of suitable openings d in the partition D'. E E are open projections or tubes rising from the floor of the wedge, and registering, as shown, with the openings in the bearing. The oil is conveyed from the wedge-chamber to the bearing by means of wicks e e, and the openings in said bearing are filled with some suitable porous material, as felt or wick. The oil is supplied to the chamber G through an opening in the lip F, to which access may be had by removing the front of the box; or a hole may be drilled in the top of said box for this purpose.

The advantage of making the oil-chamber in the wedge, as compared with a similar reservoir in the bearing, is the saving of expense. The bearing being made of brass, if an oil-chamber is formed therein a considerable quantity of that metal is required. The wedge, however, being made of cast-iron, costs but little; and, when the oil-chamber is located in it, the bearing may be made thin, and but little expense thus incurred. The wedge, also, is more easily accessible than the bearing when the oil needs to be replenished in the chamber. The chamber is formed with a roof, in order to prevent the oil from splashing out, and the central partition is to give strength to bear the weight of the car. Besides, this wedge may be applied to bearings already in use, by drilling the necessary holes, where it would be impracticable to form oil-chambers in them.

We claim—

The wedge D, having an oil chamber or reservoir, closed at the top, and having wick-tubes rising from its floor, substantially as shown and described.

In testimony that we claim the foregoing we have hereunto set our hands this 17th day of March, 1873.

HENRY A. WENDELL.
    GEORGE P. BALDWIN.

Witnesses:
 GEO. C. SHELMERDINE,
 M. DANL. CONNOLLY.